April 3, 1962 B. E. FORNEY 3,027,615
FASTENER

Filed Oct. 26, 1959 5 Sheets-Sheet 1

INVENTOR.
BILL E. FORNEY
BY
ATTORNEY

April 3, 1962    B. E. FORNEY    3,027,615
FASTENER

Filed Oct. 26, 1959    5 Sheets-Sheet 2

INVENTOR.
BILL E. FORNEY
BY Arthur L Wade
ATTORNEY

April 3, 1962  B. E. FORNEY  3,027,615
FASTENER
Filed Oct. 26, 1959  5 Sheets-Sheet 3

INVENTOR.
BILL E. FORNEY
BY Arthur L Wade
ATTORNEY

April 3, 1962  B. E. FORNEY  3,027,615
FASTENER

Filed Oct. 26, 1959  5 Sheets-Sheet 4

INVENTOR.
BILL E. FORNEY
BY Arthur L Wade
ATTORNEY

April 3, 1962   B. E. FORNEY   3,027,615
FASTENER

Filed Oct. 26, 1959

INVENTOR.
BILL E. FORNEY
BY Arthur L Wade

ATTORNEY

_United States Patent Office_ 3,027,615
Patented Apr. 3, 1962

3,027,615
FASTENER
Bill E. Forney, 2442 S. Oswego, Tulsa, Okla.
Filed Oct. 26, 1959, Ser. No. 848,832
2 Claims. (Cl. 24—116)

The present invention relates to retainers for flat link chains. More specifically, the invention relates to chain fasteners which engage flat links of a chain on their outside.

Hooks are a common means of retaining chains. Hooks have been equipped with retainers of various forms. However, both single and double-ended snap hooks have been limited to engaging a chain by fitting inside a chain link. The limitation of such an arrangement is obvious. If the hook is small enough to fit inside a chain link, the hook itself being open, the hook cannot develop the full strength of the chain.

Single-ended grab hooks, engaging the outside of a flat chain are known. However, these single-ended hooks must be attached to an anchor point, with tools, prior to engagement with a chain to retain the flat chain to the anchor point.

A principal object of the present invention is to provide a fastener which will engage the outside of a flat link of a chain, while linking the chain to an anchor point with the full strength of the chain, and to provide manually operable retaining structure on the fastener between the chain and anchor point which obviates the use of tools in placing the fastener in operative position between the chain and anchor point.

The present invention contemplates the provision of the general form of a double-ended grab-hook, proportioned to engage the outside of both the flat link of a chain and anchor point structure. The grab hook form of fastener is further proportioned to develop the full strength of the chain. Further, the grab hook engaging sections are provided with retaining means which hold the chain and anchor point structure in the engaging sections, being manually operable in holding the chain and anchor point structure and in releasing the chain and anchor point structure from the engaging sections, all these functions being accomplished without the use of tools. As the retaining means is moved quickly into operative position, the combination of the retainer and grab-hook will be referred to as a grab-snap.

Other objects, features and advantages of the invention will be apparent from the drawings, specifications and claims.

In the drawings, wherein illustrative embodiments of the invention are shown and wherein like reference numerals indicate like parts:

Figure 1:
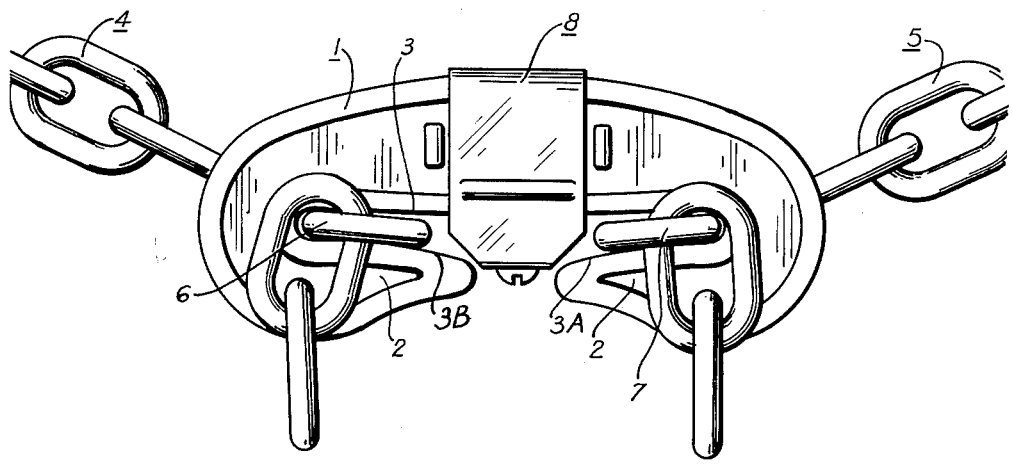
FIG. 1 is an elevation of an assembly in which a fastener embodying the present invention is shown operatively joining two lengths of chain.

Reference is made to all of the drawing figures in that the general form of a double ended grab-hook is shown. The form has a shank portion 1, enlarged as necessary to increase the section modulus and thereby permitting the double ended hook to develop a resisting moment great enough to compensate for the difference in yield strength between a closed chain link and an open hook. The nose portions 2 of the form are turned toward each other, but separated, back along the shank. A substantially flat inner surface 3 of the hook shank cooperates with surfaces 3A and 3B on each nose portion to receive a flat link of chain. Each of surfaces 3A and 3B are also substantially flat. As clearly depicted in the drawings, the nose surfaces 3A and 3B are each substantially parallel the opposite portion of shank surface 3 and spaced from surface 3 a distance to receive the opposite sides of one of flat links 6 and 7 between their two adjacent links of their chains 4 and 5. The flat links 6 and 7 are each positioned between their respective flat surfaces by being inserted between the separated nose portions 2.

FIG. 1 shows the fastener with the preferred form of a manual retainer, operatively placed about chain 4 and chain 5. Inner surfaces 3 and 3B specifically fit closely about link 6 of chain 4 and inner surfaces 3 and 3A fit closely about link 7 of chain 5, being retained in these surfaces by retainer 8. The surfaces 3, 3A and 3B accommodate the opposite sides of flat links 6 and 7 so closely that adjacent links of chains 4 and 5 prevent links 6 and 7 from being withdrawn. The result is positive retention of the chains by the fastener, effectively joining the two lengths of chain together.

Figure 2:
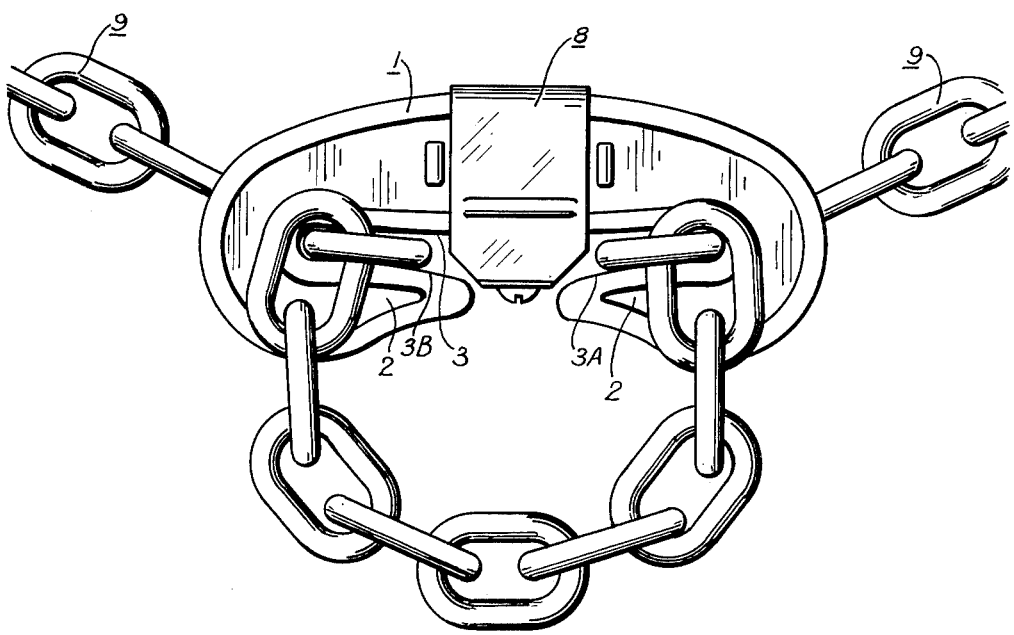
FIG. 2 illustrates the fastener operatively shortening the effective length of a single chain.

FIG. 2 shows the fastener being utilized to effectively shorten the length of chain 9. The fasteners' inner surfaces 3, 3A and 3B are used exactly as in FIG. 1, about chain links. In FIG. 2 the links are selected from chain 9 to shorten the chain 9 between its end links a desired amount. The object of the invention is again carried out in developing the full strength of the chain 9 while shortening the chain the desired amount.

Figure 3:
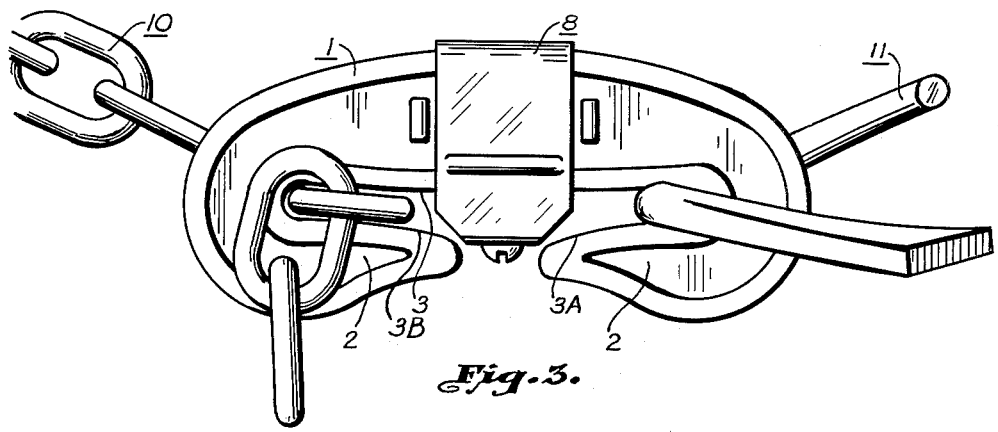
FIG. 3 illustrates the fastener operatively joining a length of chain to an anchor structure.

FIG. 3 shows the fastener being utilized to effectively connect a chain 10 to one of many types of anchor structures. FIG. 3 illustrates how one of the noses 2 can accommodate one of many possible forms of anchor structures within its surfaces 3 and 3A and thereby connect, through the fastener, chain 10 to anchor structure 11.

Figure 4:
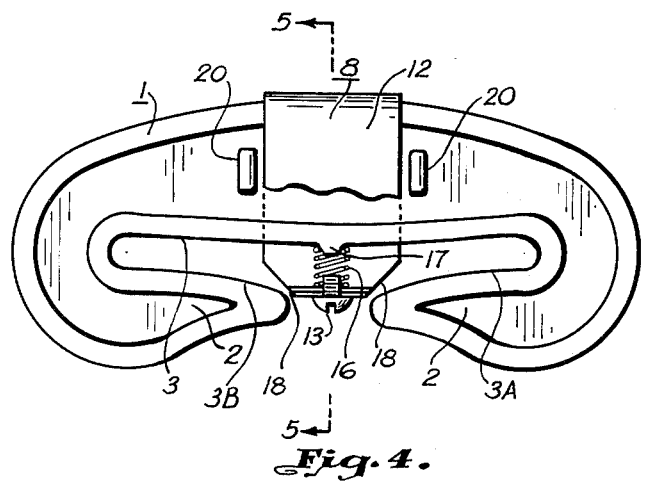
FIG. 4 is an elevation of the preferred form of fastener with the retainer partially sectioned to show its spring in operation.
Figure 5:
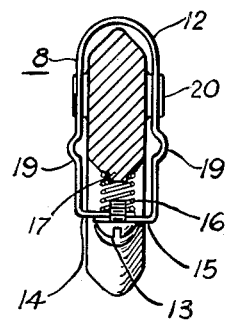
FIG. 5 is a section view taken along lines 5—5 in FIG. 4.

Referring specifically to FIGS. 4 and 5, the fastener form of FIGS. 1–3 is shown, with the preferred form of retainer 8. Retainer 8 is partially sectioned to illustrate its parts, and this arrangement, which renders the retainer conveniently operable by hand, yet effective in positively retaining chain and/or anchor structures within surfaces 3, 3A and 3B.

The retainer is basically characterized by shell 12. Shell 12 is preferably formed from a continuous strip of metallic stock. The strip is formed about the central portion of shank 1, and is lapped and joined on the inner surface 3 side by screw. The extreme ends of the strip which overlap to complete the envelopment of the center portion of shank 1 are referred to as ear 14 and 15.

Holes are drilled centrally in ear 14 and ear 15. The holes in each ear are aligned when the ears are overlapped. The screw 13 is positioned and secured in the aligned holes, joining the ears together.

Screw 13 extends upward, as oriented in FIG. 4. The shank of screw 13 is long enough to extend through both ear 14 and ear 15 and protrude above ear 14 far enough to act as a guide for spring 16. Spring 16 extends from the internal surface of ear 14 to the surface 3 at the middle of shank 1. A hump, knob, or protrusion 17 is formed on the surface 3 at the midpoint of shank 1. The upper end of spring 16 fits over this knob 17 so that the end of the spring will be retained thereby while its lower end will be retained by the shank of screw 13. With spring 16 long enough to be slightly compressed in this arrangement, it develops a force which urges shell 12 downward, against noses 2.

The corners of shell 12 are preferably beveled as shown at 18. In this arrangement, the lower portion of the retainer shell 12 is urged between the noses 2 for positive closure of the hooks. The hooks of the fastener thereby retains chains and/or anchors within the inner surfaces 3, 3A and 3B when retainer 8 is manually manipulated into operative position.

The operation of retainer 8, after describing the individual functions of its parts, is apparent. An operator need only press his thumb against screw 13, depress spring 16, and beveled surfaces 18 will be moved from noses 2 a distance sufficient to place a chain link or anchor structure within the hooks and surfaces 3. Release of the thumb pressure, allows the spring pressure to return the surfaces 18 to engagement with noses 2. The result is positive capture of the chain, or anchor structure, by the fastener.

A more complete combination is produced by providing ridges 19 in the sides of shell 12. Shell 12 may be given the additional form needed to provide these ridges, or the ridges may be separate structures attached to the shell 12. In either arrangement, ridges 19 make it possible to manually draw shell 12 upward against the force of spring 16. This provision keeps the lower end of shell 12 free of the obstruction which the operator's thumb would give to inserting the retained structure in the hook portions.

To keep shell 12 positioned centrally on shank 1, protuberances 20 may be provided on shank 1. Shell 12, wrapped about shank 1, is guided and retained against lateral displacement by these protuberances. Thus, as shell 12 is spring-urged downward and manually drawn upward, guide protuberances 12 prevent "cocking" or sidewise displacement.

Figure 6:
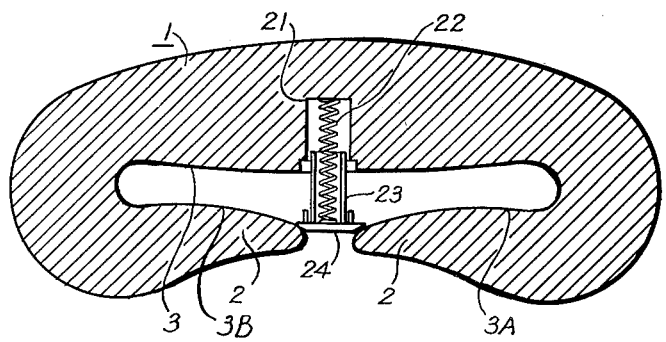
FIG. 6 is a sectioned elevation of the fastener with another form of retainer.

Referring now to FIG. 6, another form of retainer is shown in combination with shank 1, noses 2, and hook shank surfaces 3, 3A and 3B. A hole is drilled between noses 2 and in shank 1, at 21. A spring 22 is placed in hole 21 and a cylinder 23 slipped over the spring 22. Cylinder 23 has a closure-button 24 mounted on its external end. The button 24 is large enough in diameter to engage noses 2, just as beveled surfaces 18 of shell 8 engaged noses 2.

Operation of this form of retainer is, desirably, the same as that of the preceding figures. Manual pressure against button 24 forces the button from noses 2. The chain, or anchor structure, may then be placed in the hook space defined by surfaces 3, 3A and 3B. Release of the button 24 captures the retained structures positively.

Figure 7:
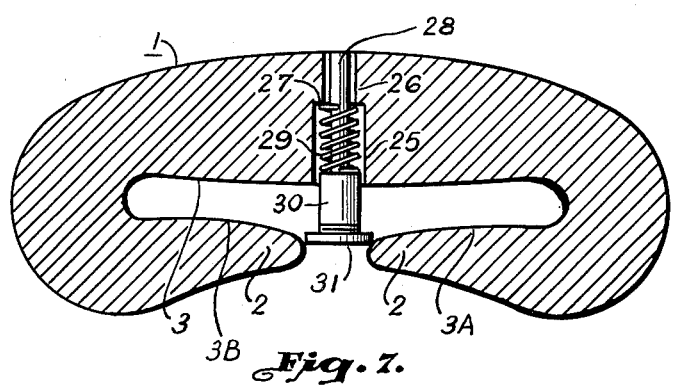
FIG. 7 is a sectioned elevation of the fastener with another form of retainer.

Referring to FIG. 7, another form of retainer is disclosed in combination with shank 1, noses 2, and hook shank surfaces 3, 3A and 3B. In this form, a first hole 25 is drilled in shank 1, similar to hole 21 disclosed in FIG. 6. However, a second hole 26, somewhat smaller than hole 25, is drilled completely through shank 1, forming a step 27. A core pin 28 is extended through both holes 25 and 26. A spring 29 is placed over pin 28 to rest against step 27 on its upper end. However, a rod 30 is threadedly engaged with lower end of pin 28. Rod 30 is larger than pin 28, but the external diameter of pin 28 is less than the diameter of hole 26. The upper end of rod 30 is a surface against which the lower end of spring 29 bears. The result is the capture of the spring between rod 30 and step 27. The combination is completed by threadedly mounting a button 31 on the lower end of rod 30 so it will function in a manner similar to button 24 of FIG. 6.

Button 31 engages noses 2, limiting the downward movement of the retainer assembly spring-urged by 29. Manual manipulation of this retainer is basically the same as the retainer in FIG. 6.

Figure 8:
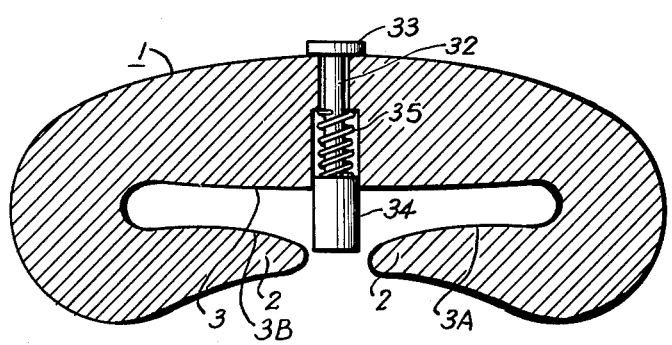
FIG. 8 is a sectioned elevation of the fastener with another form of retainer.

Referring to FIG. 8, a retainer form is disclosed which does not actually engage noses 2. The form of the two concentric bores of FIG. 7 is utilized. A core pin 32 is extended up through the stepped bores. A cap-button 33 is fixed to the back of shank 1, over the bore extending therethrough. The upper end of pin 32 is fixed to cap-button 33 and a retainer-rod 34 is threadedly attached to the bottom end of pin 32. A spring 35 is captured between the internal step of the bores and retainer-rod 34 to spring-urge the pin 32, cap 33 and rod 34 downward.

Manual manipulation of the retainer of FIG. 8 is basically the same as with the retainers FIGS. 6 and 7. Manual depression of the end of retainer-rod 34, against the force of spring 35, will retreat retainer-rod 34 into the shank 1 bore to give the necessary clearance between noses 2 for insertion of structures within the hooks. A manual grasp of cap-button 33 is also feasible, whereby the fastener assembly could be moved upwardly, away from noses 2. In either event, the retainer is removed from proximity with noses 2 in order to permit the retained bodies being placed in operative position.

Figure 9:
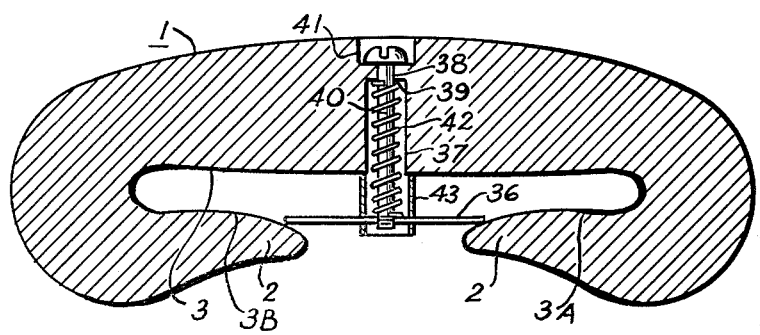
FIG. 9 is a sectioned elevation of the fastener with another form of retainer.

Referring to FIG. 9, still another form of retaining means is disclosed which, in operative position, engages noses 2. A latch plate 36 is spring-urged into engagement with noses 2. A bore 37 is drilled upwardly, into shank 1 and a smaller bore 38 is coaxially aligned with bore 37 to form a step 39 within shank 1. Pin 40 is arranged within these bores, extending completely therethrough. A bore 41 may be drilled downwardly, coaxial with bores 37 and 38. The head of pin 40 may rest in the recess provided by bore 41 so as to give no external protuberance on the back of shank 1.

The bore end of pin 40 is threadedly engaged with latch plate 36 at its midpoint so the two elements will move together. Spring 42 is captured between latch plate 36 and step 39 to spring-urge the pin 40 and latch plate 36 downwardly. A guide for latch plate 36 may be provided by cylinder 43, split along its sides to accommodate the transversally extending latch plate 36.

Manual manipulation of this form of retainer is obvious from the foregoing disclosures. Pressure on latch plate 36 moves pin 40 and latch plate 36 upwardly, away from noses 2. Accommodation of the structures to be fastened together within surfaces 3, 3A and 3B follows.

Figure 10:
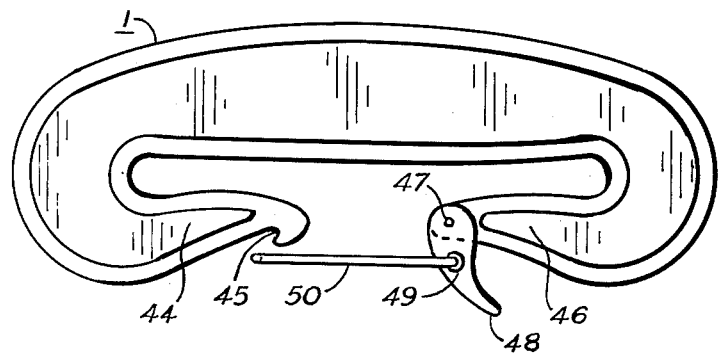
FIG. 10 is an elevation of a slight modification of the grab-hook form of the fastener with another form of retainer.

Referring to FIG. 10, shank 1 is shown provided with a particular form of noses. Nose 44 is provided with a suitable outwardly turned hook 45. Nose 46 is similar in shape to the noses 2 but is provided with a pivot pin 47 and a cam handle or locking handle 48. A pivot point 49 is provided on handle 48 a finite distance from pivot point 47 on nose 46. A wire loop 50 is extended from pivot point 49, a distance great enough to engage hook 45 on nose 44.

Wire loop 50 may be pivoted away from engagement with hook 45 in order to insert a chain, or anchor structure, within the hooks formed by noses 44 and 46 with shank 1. Wire loop 50 may then be engaged in hook 45 and locking handle 48 manually depressed until pivot point 49 is rotated about the point 47 past a line drawn between pivot point 47 and the center of hook 45. This eccentric, or cam, action causes wire loop 50 to elastically elongate. Further, after pivot point 49 passes the line between 47 and 45, it is held in position by the elastic force of wire loop 50. Manual release of this locking relationship between the parts is obtained by reversing the rotation of handle 48.

Other forms which may be given a retaining means for the fastener of the present invention are disclosed in FIGS. 11, 12, 13, and 14. All four of these figures should be considered together in appraising their disclosure. The basic form of shank 1, noses 2, and inner surfaces 3, 3A and 3B of the hook shank are utilized.

A trough-shaped retaining member 51 is pivoted at point 52. Point 52 is established by a hinge pin 53. Lugs 54 are provided, fixed to surface 3, for holding hinge pin 53 in position. Retainer trough 51 may be in a very simple form of metallic plate bent up into ears through which holes may be drilled to accommodate hinge pin 53. Spring 55 is arranged about pin 53 so that one of its ends will bear upon surface 3 while the other of its ends will bear upon retainer trough 51, spring-urging it to pivot about 52 to engagement with its nose 2. An exact duplicate of retainer trough 51, and its associated structure, is mounted adjacent to trough 51 to engage the second nose 2.

Figure 13:
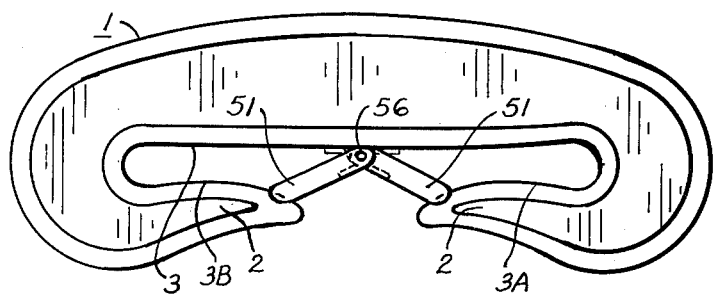
FIG. 13 is an elevation of the fastener of FIGS. 1–9 with the retainers of FIG. 11 mounted on a common pivot.

In FIG. 13, an arrangement is shown whereby both retainer troughs may be pivoted from a single pivot point 56. Suitable springs simultaneously, or separately, urge the retainer troughs towards their respective noses.

Figure 11:
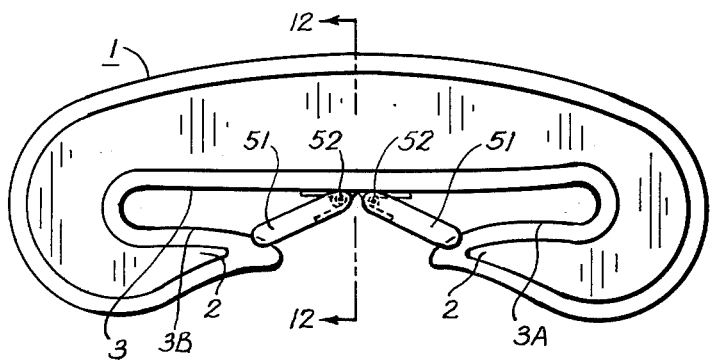
FIG. 11 is an elevation of the fastener of FIGS. 1–9 with a form of separate retainer for each hook nose.
Figure 12:
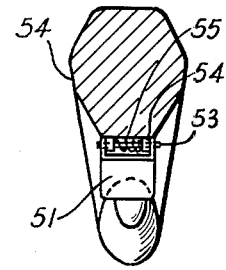
FIG. 12 is a section view taken along lines 12—12 in FIG. 11.
Figure 14:
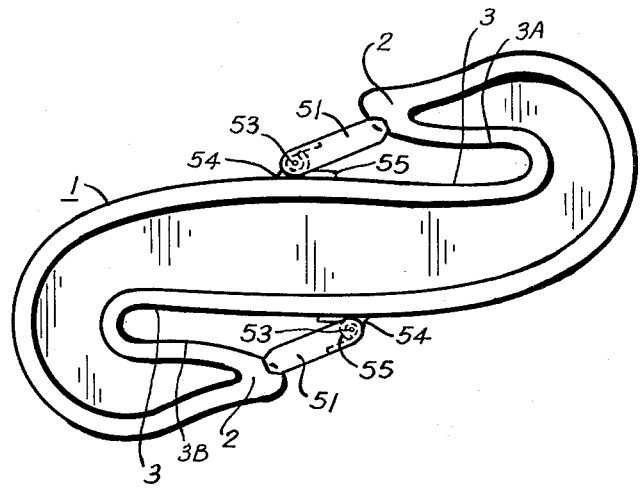
FIG. 14 is an elevation of another form of the grab-hook fastener utilizing the retainers of FIG. 11.

FIG. 14 is included to illustrate that the basic form of double ended grab-hook will also function with the hook noses 2 turned to opposite sides of shank 1. Various types of retaining means are equally adaptable to this S shaped, double ended grab-hook. The retainer means of FIG. 11 are illustrated as adapted for similar service on the form of the grab-hook illustrated in FIG. 14.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. A fastening member for a chain including,
   a shank sized to develop a resisting moment great enough to compensate for the difference in yield strength between a closed chain link and an open hook,
   a nose portion formed on each opposite end of the shank and turned toward each other back along the shank, there being
   surfaces formed on the interior of each nose portion and opposite shank portion, each pair of surfaces so shaped and the surfaces of each pair spaced a distance apart to receive a chain link closely enough to prevent withdrawal of the chain in a direction transverse the axis of the shank and nose portions formed on each end,
   a manually operable retaining means mounted on the member, thereby retaining the chain links between the surfaces of the shank, said retaining means being manually operable so as to permit the chain link to be placed in or removed from the fastening member without the use of tools,
   and the manually operable retainer comprising, a shell in the form of a continuous strip bent-formed about the shank so as to overlap above the nose portions, a spring placed between the shank and the shell to urge the shell against the nose portions on the shank ends, a screw threaded through both overlapping portions of the shell and extending beyond them and into the coils of the spring, and protuberances formed on the sides of the shank on each side of the shell to guide and retain the shell as the shell engages and retreats from engagement with the noses.

2. A fastening member for a chain of relatively flat links including,
   a shank of elongated form and of material and size relative to the material and size of the chain to be fastened which will be at least equal in strength to that of a closed link of the chain, there being
   a substantially flat surface on the shank along the elongated form of the shank,
   a nose portion formed on each of the opposite ends of the shank and turned toward opposite ends of of the shank and back along the shank and over the flat surface on the shank with the end of the nose portions separated to receive a link of the chain between each nose portion and the said shank surface,
   and there being a substantially flat surface formed on each nose portion toward the shank surface and extended substantially parallel the opposite portion of the shank surface close to the junction of the nose portion with the shank and spaced from the shank surface a distance to closely receive the opposite sides of a flat link between the two adjacent links of the chain as the link is inserted between the nose portions, the adjacent links of each link bearing against the shank and nose portion to prevent withdrawal of the chain from between the surfaces.

References Cited in the file of this patent
UNITED STATES PATENTS

| | | |
|---|---|---|
| 222,203 | Sanford | Dec. 2, 1879 |
| 301,491 | Gibbons | July 8, 1884 |
| 864,652 | King | Aug. 27, 1907 |
| 2,556,741 | Reyburn | June 12, 1951 |

FOREIGN PATENTS

| | | |
|---|---|---|
| 1,181,534 | France | Jan. 12, 1959 |